United States Patent [19]
Lee et al.

[11] Patent Number: 5,724,893
[45] Date of Patent: Mar. 10, 1998

[54] SERVO-TYPE SHAKING TABLE ASSEMBLY

[75] Inventors: Yuan-jyi Lee, Taichung Hsien; Chao-hsi Cheng; Kelson Z. Y. Yen, both of Taichung, all of Taiwan

[73] Assignee: Taichung Machinery Works Co. Ltd., Taiwan

[21] Appl. No.: 731,296

[22] Filed: Oct. 15, 1996

[51] Int. Cl.⁶ .................................................. F16H 25/22
[52] U.S. Cl. ........................... 108/20; 108/137; 108/143; 74/490.09
[58] Field of Search ..................... 74/490.09; 108/143, 108/137, 20; 248/184, 657, 661

[56] References Cited

U.S. PATENT DOCUMENTS

| | | | |
|---|---|---|---|
| 3,495,519 | 2/1970 | Alfsen et al. | 108/143 X |
| 3,572,680 | 3/1971 | Neff | 108/143 X |
| 4,409,860 | 10/1983 | Moriyama et al. | 108/143 X |
| 4,964,503 | 10/1990 | Nishiyama et al. | 248/661 X |
| 5,228,358 | 7/1993 | Sakino et al. | 108/20 X |
| 5,251,501 | 10/1993 | Katahira | 108/20 X |
| 5,309,847 | 5/1994 | Matsumoto | 74/490.09 X |
| 5,345,832 | 9/1994 | Takei | 74/490.09 X |
| 5,613,403 | 3/1997 | Takei | 74/490.09 |

*Primary Examiner*—Peter M. Cuomo
*Assistant Examiner*—Janet M. Wilkens
*Attorney, Agent, or Firm*—Oppenheimer Poms Smith

[57] ABSTRACT

A shaking table assembly includes a plurality of first linear guides arranged in parallel with each other. A supporting table is slidably mounted on the first linear guides along a longitudinal direction thereof. A plurality of second linear guides are fixedly mounted on a top surface of the supporting table and are arranged in parallel with each other and perpendicular to the plurality of first linear guides. A testing table is slidably mounted on the second linear guides along a longitudinal direction thereof.

4 Claims, 6 Drawing Sheets

SERVO-TYPE SHAKING TABLE ASSEMBLY

FIELD OF THE INVENTION

The present invention relates to a shaking table assembly, and more particularly to a servo-type shaking table assembly.

BACKGROUND OF THE INVENTION

A shaking table is primarily applied in vibration tests used for the academic research and the development of a new product.

The shaking table can be used to perform an earthquake simulation on an active mass such as a building structure and the like by means of providing vibration on the active mass via the shaking table according to a pre-selected earthquake spectrum of different modes, thereby facilitating the research of active and passive antivibration.

The shaking table can also be employed to perform a vibration simulation on cars, electronic parts and the like such that products of new types can suffer a pre-determined level of vibration.

Two conventional shaking tables are shown in FIGS. 5 and 6, however, there still remain shortcomings therein. There will be a complete illustration in the detailed description of the preferred embodiments, concerning the conventional shaking tables.

The present invention has arisen to mitigate and/or obviate disadvantages of the conventional shaking tables.

SUMMARY OF THE INVENTION

In accordance with one aspect of the present invention, there is provided a shaking table assembly comprising a plurality of first linear guides arranged in parallel with each other. A supporting table is slidably mounted on the first linear guides along a longitudinal direction thereof.

A first ball screw is rotatably mounted under the supporting table and is arranged in parallel with the first stimuli linear guides. A first nut is fixedly mounted on an underside of the supporting table and meshes with the first ball screw. A first servo motor is connected with the first ball screw for rotating the first ball screw.

A plurality of second linear guides are fixedly mounted on a top surface of the supporting table and are arranged in parallel with each other and perpendicular to the plurality of first linear guides. A testing table is slidably mounted on the second linear guides along a longitudinal direction thereof.

A second ball screw is rotatably mounted under the testing table and is arranged in parallel with the second linear guides. A second nut is fixedly mounted on an underside of the testing table and meshes with the second ball screw. A second servo motor is connected with the second ball screw for rotating the second ball screw.

Further features of the present invention will become apparent from a careful reading of the detailed description with appropriate reference to the accompanying drawings.

DETAILED DESCRIPTION OF THE PREFERRED EMBODIMENTS

Figure 5:
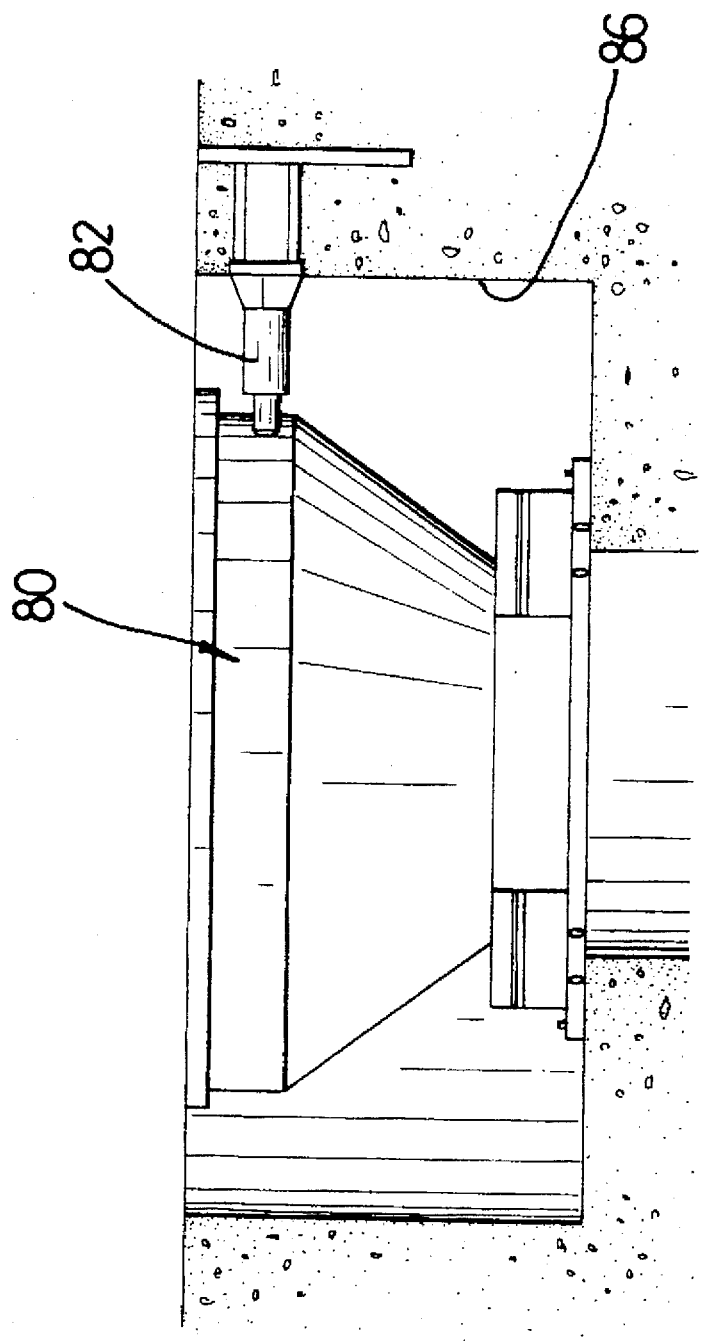
FIG. 5 is front plan view of a hydraulic shaking table in accordance with the prior art.
Figure 6:
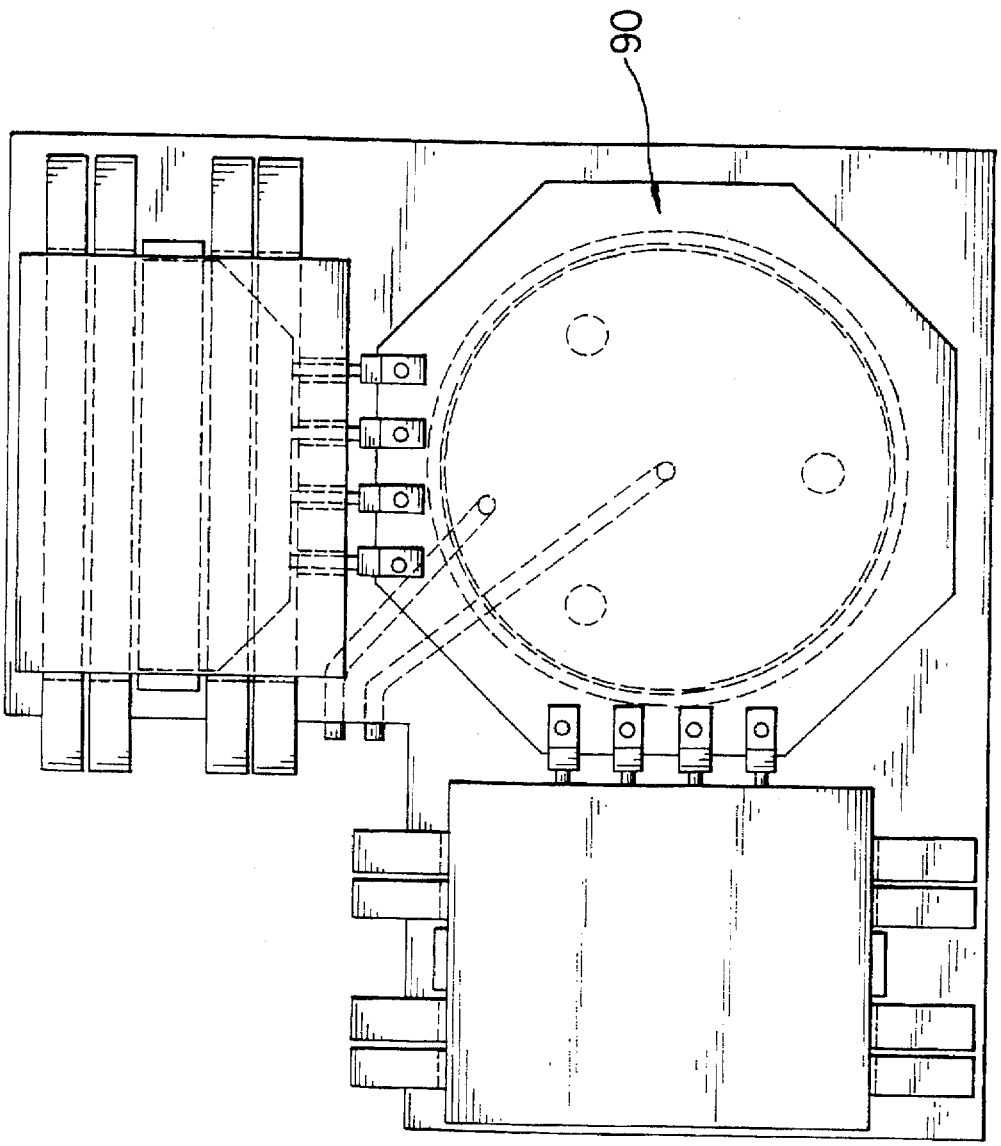
FIG. 6 is top plan view of an electromagnetic shaking table in accordance with the prior art.

For a better understanding of the present invention, reference is made to FIGS. 5 and 6 illustrating conventional shaking tables in accordance with the prior art.

The conventional shaking table includes a hydraulic shaking table and an electromagnetic shaking table.

FIG. 5 shows a conventional hydraulic shaking table 80 which is mounted in a cave 86 defined under the ground. A hydraulic pump 82 is provided to apply a force on the shaking table 80, thereby vibrating the shaking table 80. By such an arrangement, however, the hydraulic shaking table 80 occupies a large volume such that its sensitivity is not great enough, thereby easily causing a distortion phenomenon when a high frequency of vibration is required.

FIG. 6 shows a conventional electromagnetic shaking table 90 which is primarily suitable for vibration spectrum with a high frequency and a short stroke. By such an arrangement, however, the electromagnetic shaking table 90 cannot be used to simulate vibration with a long stroke. In addition, the electromagnetic shaking table 90 is commonly used in a vibrational endurance test on electronic parts light in weight and cannot be used to support articles heavy in weight, thereby greatly limiting the versatility thereof.

Figure 1:
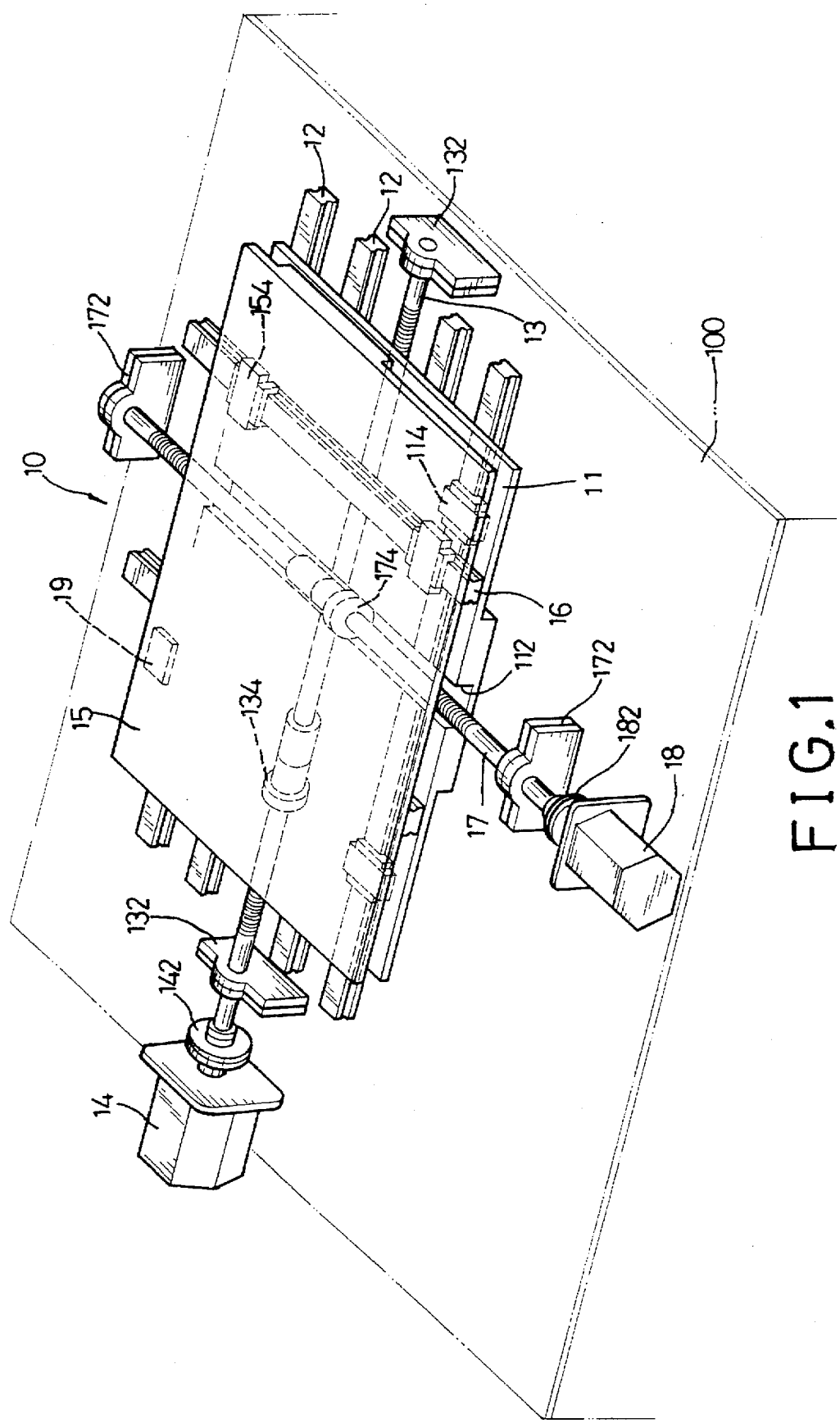
FIG. 1 is a perspective view of a shaking table assembly in accordance with the present invention.
Figure 2:
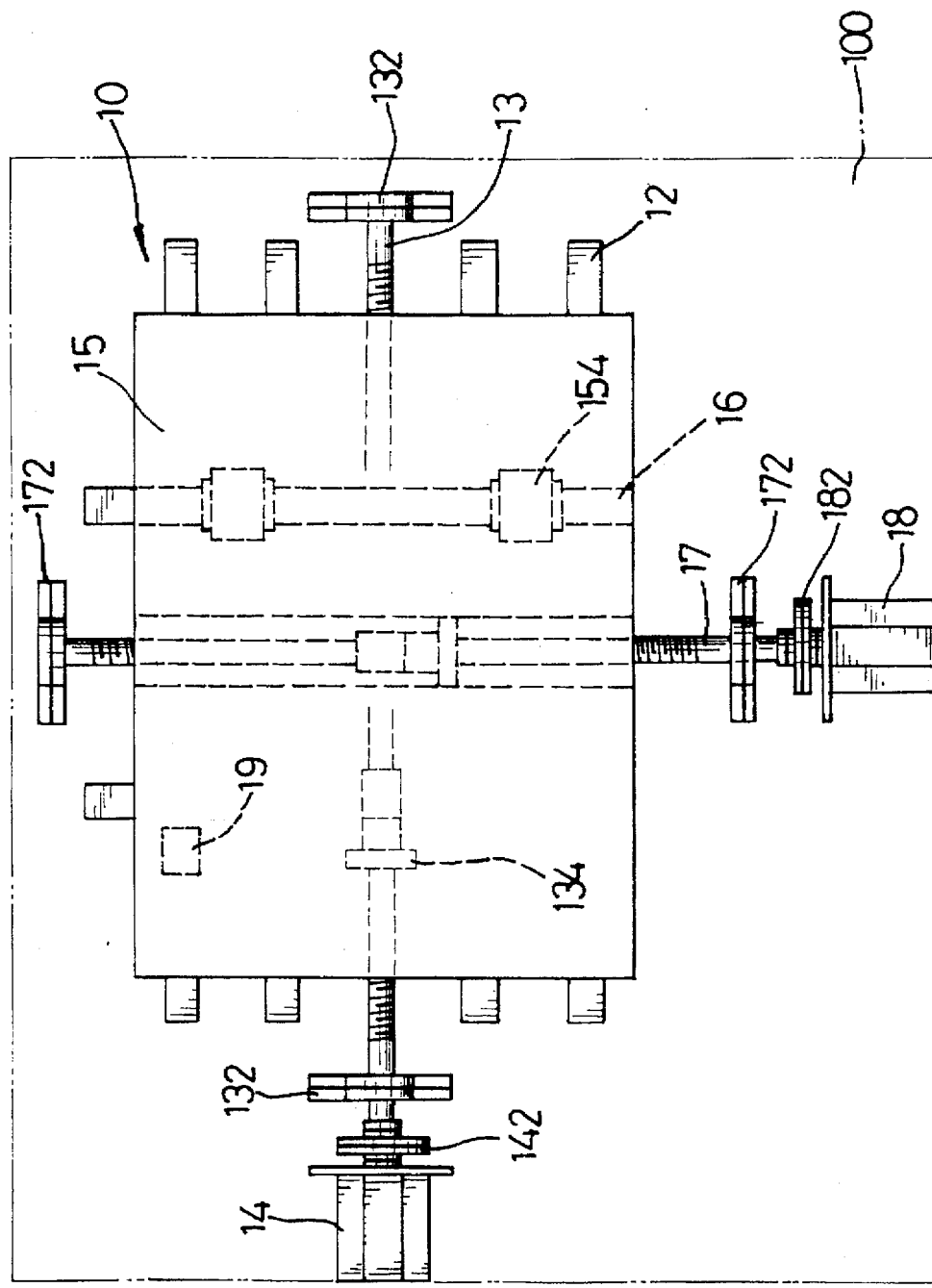
FIG. 2 is a top plan view of FIG. 1.

Referring to the remaining drawings, and initially to FIGS. 1 and 2, a shaking table assembly 10 in accordance with the present invention comprises four first linear guides 12 each fixedly mounted on a base plate 100 and each arranged in parallel with each other. A supporting table 11 is slidably mounted on each of the first linear guides 12 along a longitudinal direction thereof.

Preferably, four pairs of inverted U-shaped first sliding blocks 114 are fixedly mounted on an underside of the supporting table 11 and each pair of first sliding blocks 114 are slidably mounted on each of the four first linear guides 12.

A first ball screw 13 is rotatably mounted under the supporting table 11 and is arranged in parallel with each of the first linear guides 12. A first nut 134 is fixedly mounted on the underside of the supporting table 11 and meshes with the first ball screw 13.

Two bearing bases 132 are each mounted on each of two distal ends of the first ball screw 13 for supporting the first ball screws 13. A first servo motor 14 is connected with the first ball screw 13 by means of a coupling 142 for rotating the first ball screw 13.

Two second linear guides 16 arranged in parallel with each other are each fixedly mounted on a top surface of the supporting table 11 and are each arranged perpendicular to each of the first linear guides 12.

A testing table 15 is slidably mounted on each of the second linear guides 16 along a longitudinal direction thereof. A plurality of sensors 19 (only one sensor 19 is shown) are each mounted on the testing table 15.

Preferably, two pairs of inverted U-shaped second sliding blocks 154 are fixedly mounted on an underside of the testing table 15 and each pair of second sliding blocks 154 are slidably mounted on each of the two second linear guides 16.

A second ball screw 17 is rotatably mounted under the testing table 15 and is arranged in parallel with each of the second linear guides 16. A second nut 174 is fixedly mounted on the underside of the testing table 15 and meshes with the second ball screw 17.

Preferably, the supporting table 11 includes a guiding groove 112 defined therein for receiving the second nut 174 together with the second ball screw 17 therein.

Two bearing bases 172 are each mounted on each of two distal ends of the second ball screws 17 for supporting the second ball screws 17. A second servo motor 18 is connected with the second ball screw 17 by means of a coupling 182 for rotating the second ball screw 17.

Figure 3:
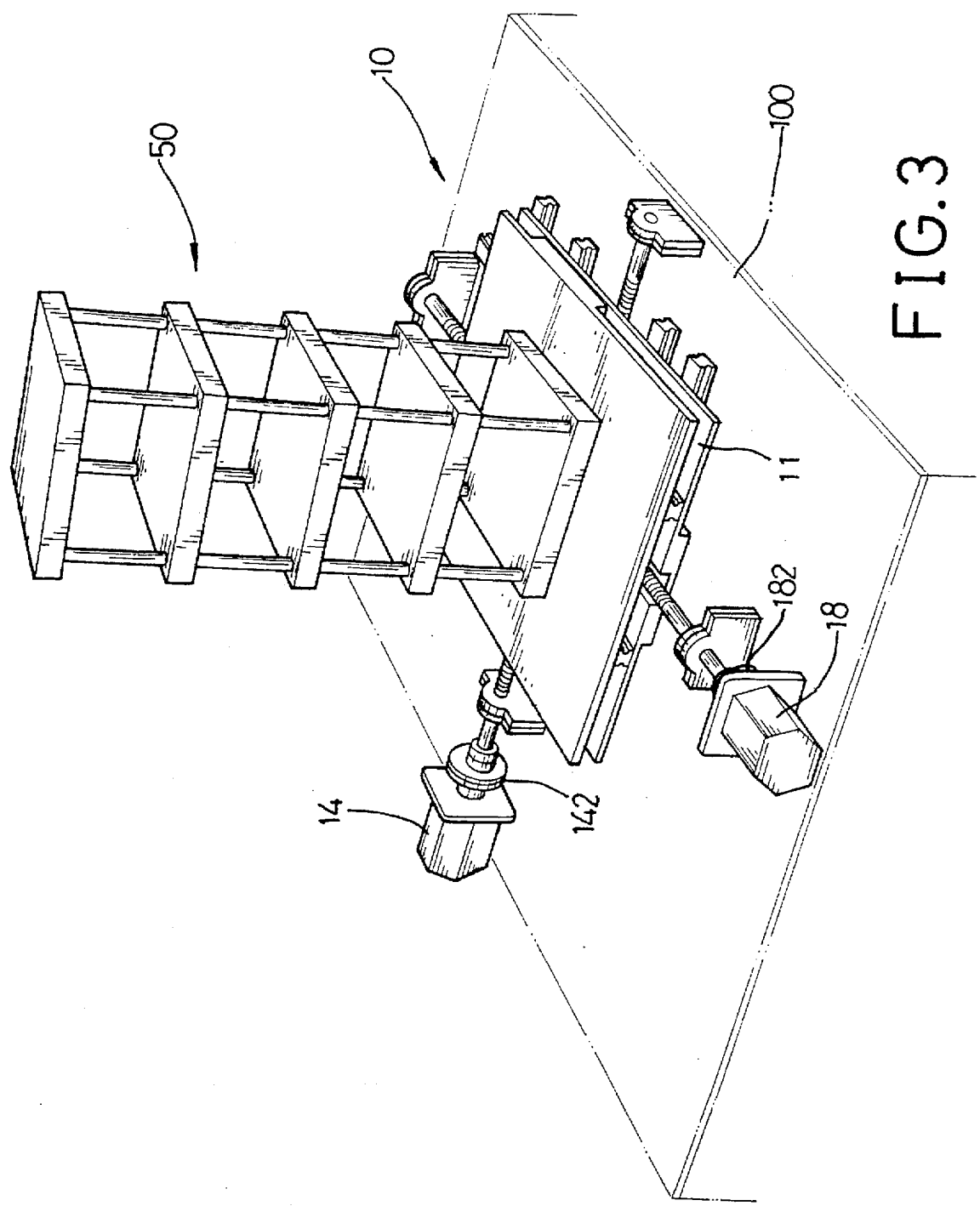
FIG. 3 is an operational view of FIG. 1.

In operation, referring to FIG. 3 with reference to FIG. 1, an active mass 50 such as a building structure and the like can be placed on the testing table 11 for being subjected to an earthquake simulation.

The first ball screw 13 can be rotated by means of the first servo motor 14, thereby moving the supporting table 11 and the testing table 15 together with the active mass 50 along the longitudinal direction of each of the first linear guides 12 by means of a co-operation between the first ball screw 13 and the first nut 134.

The second ball screw 17 can then be rotated by means of the second servo motor 18, thereby only moving the testing table 15 together with the active mass 50 along the longitudinal direction of each of the second linear guides 16 by means of a co-operation between the second ball screw 17 and the second nut 174.

By such an arrangement, the active mass 50 can be subjected to a two-dimensional vibration test by means of the first and second servo motors 14 and 18.

Figure 4:
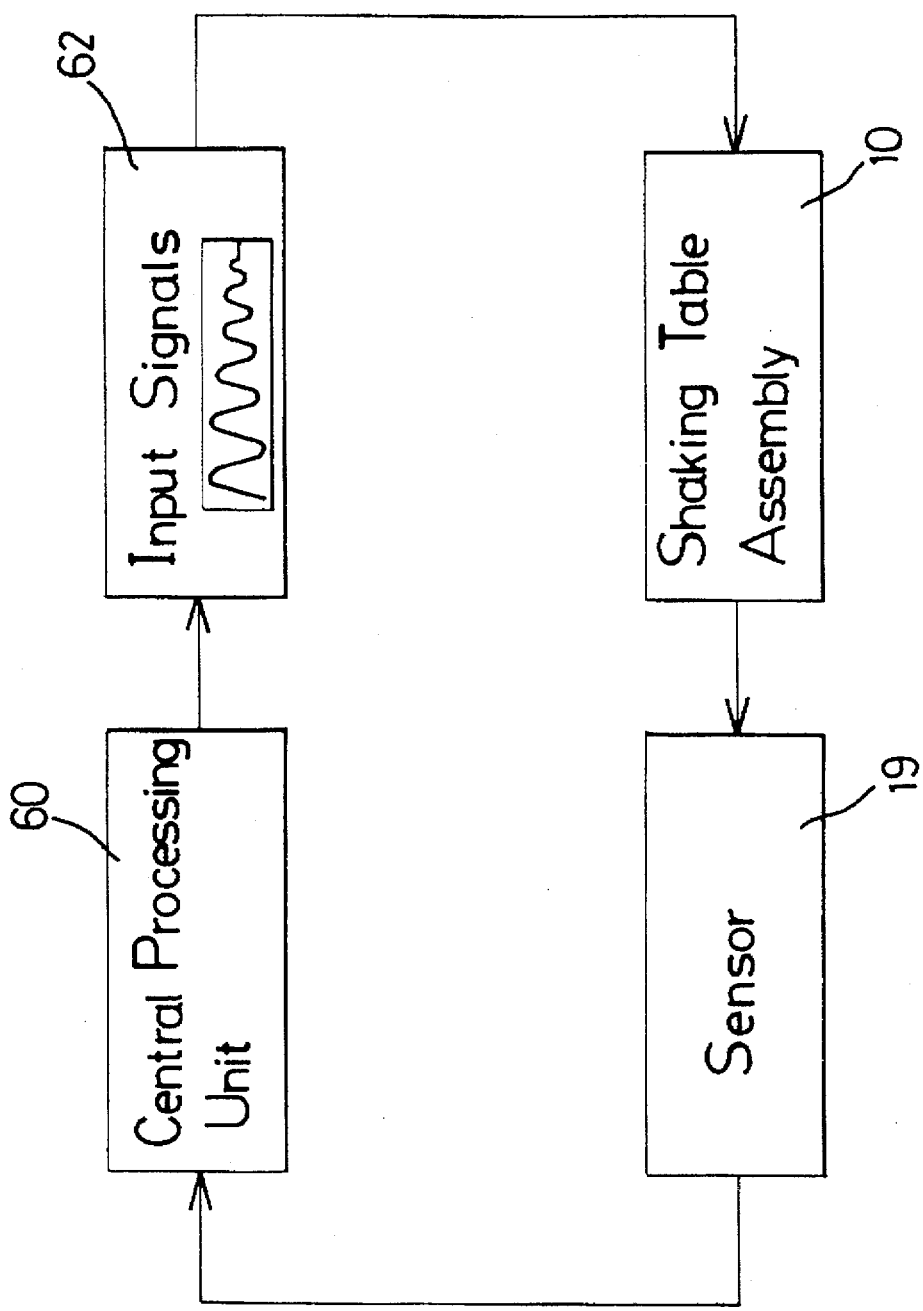
FIG. 4 is a flow chart showing an operation of the shaking table assembly.

Referring to FIGS. 3 and 4 with reference to FIG. 1, a central processing unit 60 (not shown in FIG. 1) is provided and can be used to supply input signals 62 into the shaking table assembly 10 according to data obtained from a preselected earthquake spectrum, thereby driving the first and second servo motors 14 and 18 to respectively actuate the supporting and testing tables 11 and 15 to move such that the active mass 50 can be subjected to a two-dimensional earthquake simulation.

The sensors 19 can then detect a displacement, velocity and acceleration of the active mass 50 due to vibration and supply the data into the central processing unit 60 to be processed, thereby forming a closed circuit system.

The above procedures can be repeated continuously such that an influence of the earthquake spectrum of different modes on the active mass 50 can be obtained.

Accordingly, by such an arrangement, the active mass 50 is subjected to an earthquake simulation by means of a closed circuit system such that the shaking table assembly 10 can be used to simulate vibration tests according to the earthquake spectrum of different modes without a possibility of distortion.

In addition, the shaking table assembly 10 can be used to perform the earthquake simulation two-dimensionally, thereby greatly increasing the precision of the experimental results and the versatility of the shaking table assembly 10.

It should be clear to those skilled in the art that further embodiments of the present invention can be made without departing from the spirit and scope of the present invention.

What is claimed is:

1. A shaking table assembly comprising:

a plurality of first linear guides arranged in parallel with each other;

a supporting table slidably mounted on said first linear guides along a longitudinal direction thereof;

a first ball screw rotatably disposed under said supporting table and arranged in parallel with said first linear guides;

a first nut fixedly mounted on an underside of said supporting table and meshing with said first ball screw;

a first servo motor directly connected with said first ball screw for rotating said first ball screw which co-operates with said first nut to move said supporting table along the longitudinal direction thereof;

a plurality of second linear guides fixedly mounted on a top surface of said supporting table and arranged in parallel with each other and perpendicular to said plurality of first linear guides;

a testing table slidably mounted on said second linear guides along a longitudinal direction thereof;

a second ball screw rotatably disposed under said testing table and arranged in parallel with said second linear guides;

a second nut fixedly mounted on an underside of said testing table and meshing with said second ball screw; and a second servo motor directly connected with said second ball screw for rotating said second ball screw which co-operates with said second nut to move said testing table along the longitudinal direction thereof.

2. The shaking table assembly in accordance with claim 1, further comprising a plurality of inverted U-shaped sliding blocks fixedly mounted on the underside of said supporting table and each slidably mounted on each of said plurality of first linear guides.

3. The shaking table assembly in accordance with claim 1, further comprising a plurality of inverted U-shaped sliding blocks fixedly mounted on the underside of said testing table and each slidably mounted on each of said plurality of second linear guides.

4. A shaking table assembly comprising:

a base plate;

a plurality of first linear guides fixedly mounted to said base plate in parallel with each other;

a supporting table slidably mounted on said first linear guides along a longitudinal direction thereof;

a first pair of bearing bases fixedly mounted to said base plate;

a first ball screw rotatably secured beneath said supporting table and arranged in parallel with said first linear guides, said first ball screw including opposing ends which are rotatably supported by said first pair of bearing bases;

a first nut fixedly mounted on an underside of said supporting table and meshing with said first ball screw;

a first servo motor directly connected to said first ball screw and adapted to rotate said first ball screw to engage said first nut to move said supporting table along the longitudinal direction thereof;

a plurality of second linear guides fixedly mounted on a top surface of said supporting table and arranged in parallel with each other and perpendicular to said plurality of first linear guides;

a testing table slidably mounted on said second linear guides along a longitudinal direction thereof;

a second pair of bearing bases fixedly mounted to said base plate;

a second ball screw rotatably secured beneath said testing table and arranged in parallel with said second linear guides, said second ball screw including opposing ends which are rotatably supported by said second pair of bearing bases;

a second nut fixedly mounted on an underside of said testing table and meshing with said second ball screw; and a second servo motor directly connected to said second ball screw and adapted to rotate said second ball screw to engage said second nut to move said testing table along the longitudinal direction thereof.

* * * * *